Jan. 23, 1962     J. J. HAPPELL ET AL     3,018,239
EXPERIMENTAL LIQUID METAL FUEL REACTOR

Original Filed Oct. 14, 1958     9 Sheets-Sheet 1

INVENTORS
JOHN J. HAPPELL, GEORGE
RICHARD THOMAS, RICHARD
P. DENISE, JOHN L. BUNTS, JR.

BY *Roland A. Anderson*
       *Attorney*

Jan. 23, 1962 J. J. HAPPELL ET AL 3,018,239
EXPERIMENTAL LIQUID METAL FUEL REACTOR
Original Filed Oct. 14, 1958 9 Sheets-Sheet 3
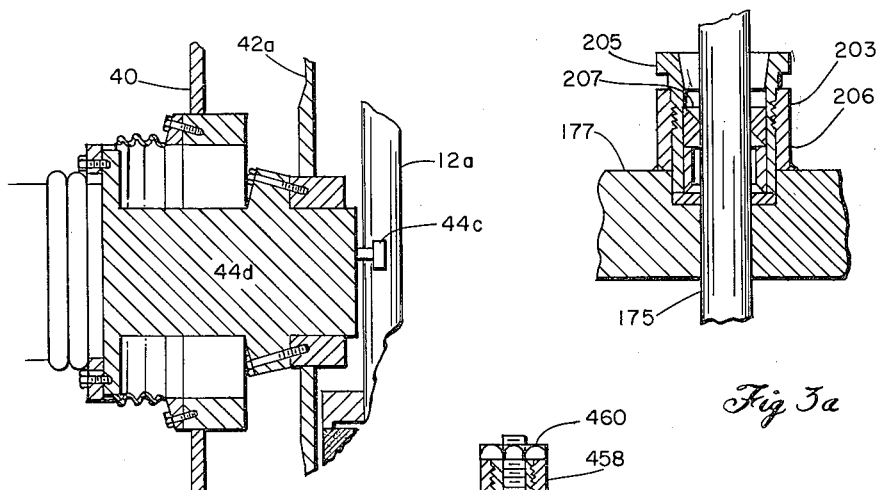
Fig 3a
Fig 3b
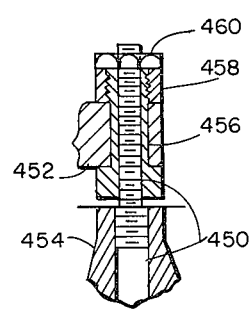
Fig 3d
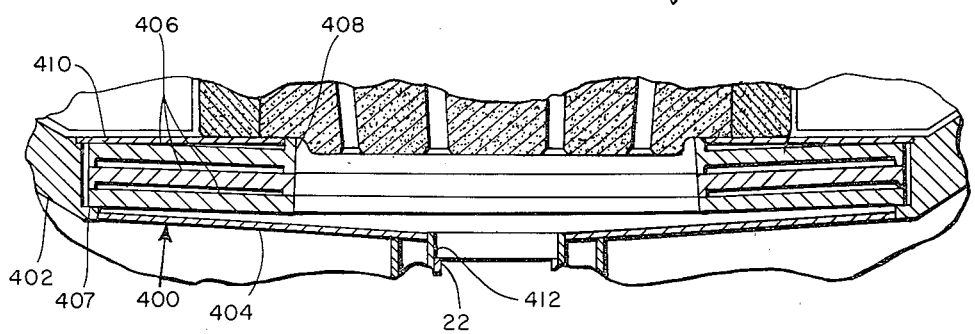
Fig 3c
INVENTORS
JOHN J. HAPPELL, GEORGE
RICHARD THOMAS, RICHARD
P. DENISE, JOHN L. BUNTS, JR
BY
ATTORNEY INVENTORS
JOHN J. HAPPELL, GEORGE
RICHARD THOMAS, RICHARD
P. DENISE, JOHN L. BUNTS, JR.

Jan. 23, 1962     J. J. HAPPELL ET AL     3,018,239
EXPERIMENTAL LIQUID METAL FUEL REACTOR
Original Filed Oct. 14, 1958     9 Sheets-Sheet 5

INVENTORS
JOHN J. HAPPELL, GEORGE
RICHARD THOMAS, RICHARD
P. DENISE, JOHN L. BUNTS, JR.

BY

INVENTORS
JOHN J. HAPPELL, GEORGE
RICHARD THOMAS, RICHARD
P. DENISE, JOHN L. BUNTS, JR.

INVENTORS
JOHN J. HAPPELL, GEORGE
RICHARD THOMAS, RICHARD
P. DENISE, JOHN L. BUNTS, JR.

BY
ATTORNEY

INVENTORS
JOHN J. HAPPELL, GEORGE
RICHARD THOMAS, RICHARD
P. DENISE, JOHN L. BUNTS, JR.

United States Patent Office 3,018,239
Patented Jan. 23, 1962

3,018,239
EXPERIMENTAL LIQUID METAL FUEL REACTOR
John J. Happell, George Richard Thomas, Richard P. Denise, and John L. Bunts, Jr., all of Lynchburg, Va., assignors to the United States of America as represented by the United States Atomic Energy Commission
Continuation of application Ser. No. 767,245, Oct. 14, 1958. This application Feb. 21, 1961, Ser. No. 90,894
3 Claims. (Cl. 204—193.2)

This invention relates to a nuclear reactor and more particularly to an experimental liquid metal fuel nuclear reactor.

This application is a continuation of Serial Number 767,245, filed on October 14, 1958, and now abandoned.

In a liquid metal fuel reactor, a given amount of fissile material is dissolved in a metal which is maintained at such an elevated temperature that the solution is liquefied. The concentration of fissile material is such that when a certain amount of the solution is concentrated within a given volume of a specified configuration (e.g., the reactor) with a given amount of moderation, the fissile material contained therein forms a critical mass capable of maintaining a nuclear chain-type reaction. When the fissile material bearing solution is removed from the conditions given above it is no longer critical and will not sustain a nuclear chain-type reaction. In this manner the solution may be pumped out of the reaction area and through an external heat exchanger where the heat of reaction may be removed and utilized for some useful purpose.

The liquid metal fuel reactor of this invention is specifically designed to permit extensive and varied types of experimentation to be conducted. For this purpose, there are included many particular features which enhance the utility of the reactor for experimental purposes and provide necessary information for designing a full scale liquid metal fuel reactor for use in the production of power. More particularly, the reactor utilizes a core and reflector of novel construction made up of quadrant shaped graphite blocks which allow a wide range of possible sizes. The core can be constructed of any number of wedge-shaped graphite pieces, or may be constructed of a single monolithic graphite cylinder, depending upon the maximum size of graphite available. The use of large graphite blocks reduces machining and overall reactor costs. A relatively simple compression type graphite-to-metal seal, allowing relative radial expansion to occur, is used, thereby avoiding complex, mechanical weld or pressed joints of doubtful integrity, and this has the further advantage of keeping graphite and metal stresses at a practical level. Temperature compensated molybdenum rods firmly clamp the graphite internals, and in this way tolerances are kept at a level where possible variances in physical property are permissible. The core in this way is removably mounted to permit replacement thereof, and this has the added advantage of allowing radiation growth both in the axial and radial directions. Relative temperature expansion may take place between the central reactor core and side reflector which eliminates tensile (hoop) stresses in the reflector. Hence, the arrangement is designed to eliminate all graphite structural tensile stresses wherever possible, except those arising from thermal stresses.

To permit the experimental use previously mentioned and hence the evaluation of a liquid metal fuel reactor as a power breeder, the instant reactor is also provided in its internals with an arrangement whereby separate reflector fluid flow may be conducted. As is understood in the art, the reflector fluid is a solution containing some fertile material such as thorium which, upon the capture of a reactor produced neutron, is converted ultimately into $U^{233}$ which is a fissile material capable of sustaining a chain-type fission reaction. For this purpose, the core incorporates a barrier between core fluid and reactor fluid composed of graphite which affords greater neutron economy than a steel barrier would. The graphite barrier is a part of the core itself and results in inherently greater mechanical strength. The number of cemented joints between core and reactor fluid is minimized, and core flow passage arrangement is designed to reduce possible interleakage of reflector and core fluids.

It is thus a first object of this invention to provide a liquid metal fuel reactor of simple and convenient construction.

It is a further object of this invention to provide a liquid metal fuel reactor utilizing a replaceable core made from segmented graphite as the moderator thereof.

It is a further object to provide a novel reactor core in which graphite blocks are assembled into a tensile stress reduced structure in which relative radial expansion between the graphite and supporting metal is permitted.

Still another object is to provide a graphite reactor core in which graphite is utilized as a barrier between core and reactor fluids and said barrier made integral with the core itself thereby resulting in inherently greater mechanical strength.

Another object of the invention is to produce a liquid metal fuel reactor core of graphite core construction in which there is provided separate core and reactor fluid flow and provision is made to reduce the possibility of leakage between reflector and core fluids.

Other objects and features of this invention will hereinafter become more readily apparent to those skilled in the art as the disclosure is made in the following detailed description of a preferred embodiment thereof as illustrated in the accompanying sheets of drawings in which:

FIGURES 3a, 3b, 3c and 3d are directed to details of the reactor internals;

The fuel solution used as the primary fluid in this reactor is composed of enriched uranium dissolved in pure bismuth with various additives to prevent system oxidation and corrosion. Enriched uranium is a uranium metal in which the abundance of the $U^{235}$ isotope is increased above the amount normally contained therein. The enrichment of this particular uranium fuel is 93.5 percent $U^{235}$ by weight. The concentration of the uranium fuel in the bismuth is about 800 parts per million (p.p.m.). Magnesuim is added as a deoxidizer to the solution in the amount of 350 p.p.m. to prevent any possible oxidation of the uranium fuel. Zirconium is added to the solution in the amount of 200 p.p.m. as a corrosion inhibitor for the primary system. The reflector coolant fluid is bismuth containing the same additives in the same proportion as the fuel solution with the exception of the uranium. In this manner no serious consequences will occur should a leak develop between the core pass and the reflector pass and, should the leak be severe enough, the reactor may then be operated as a single fluid reactor with fuel solution occupying both reactor passes.

Figure 1:
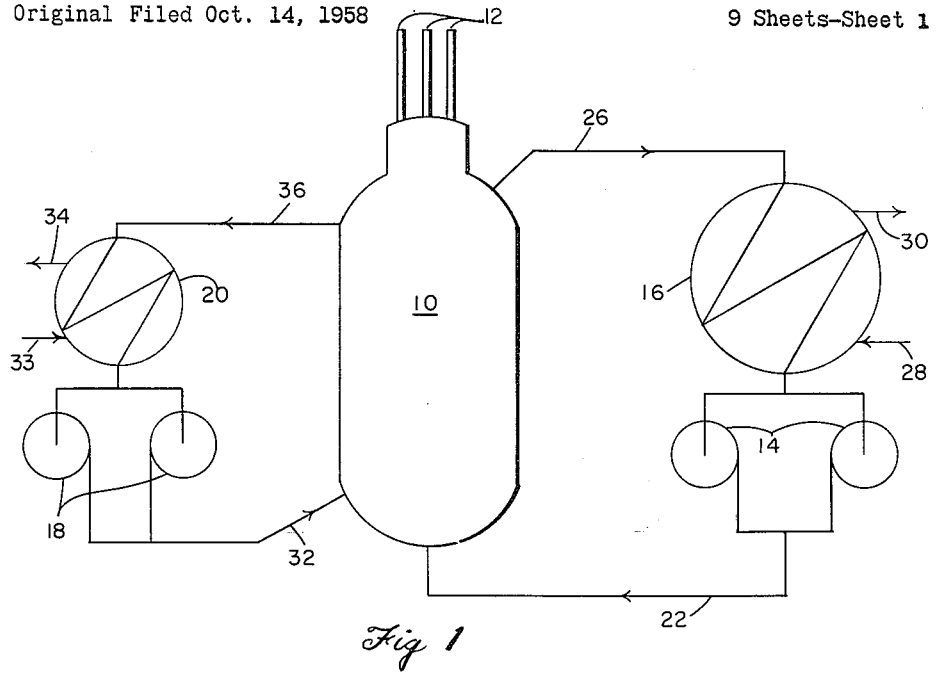
FIGURE 1 is a schematic diagram showing the reactor of the invention within a heat transfer system.
Figure 7:
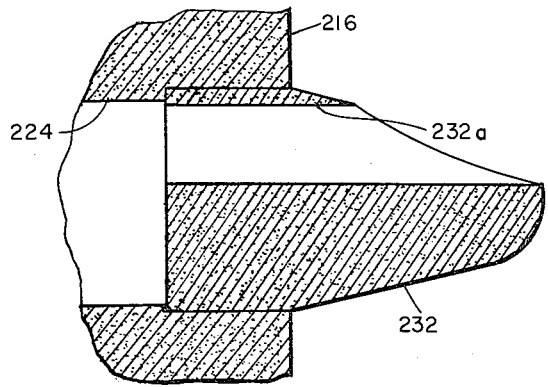
FIGURE 7 is a section view of the core flow fitting taken along the line 7—7 of FIGURE 6.
Figure 6:
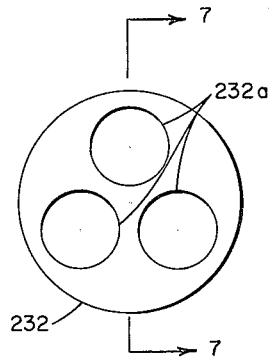
FIGURE 6 is an enlarged detail of the core flow fitting shown in FIGURE 5.

In FIGURE 1, nuclear reactor 10 of the present invention is shown in a heat transfer system for removing heat therefrom. The system is composed of reactor 10 having top mounted control rods 12, primary fluid pumps 14, a core fluid heat exchanger 16, reflector coolant pumps 18, and a reflector fluid heat exchanger 20.

The material used in control rods 12 is a substance which will absorb neutrons and may be selected from a group including hafnium, boron carbide, boron stainless steel, or tantalum, as is understood in the art. The flow rate of the primary fluid through the core is controlled by varying the speed of primary pumps 14 which in turn regulate the temperature increase of the primary fluid through reactor 10, utilizing the negative temperature coefficient of reactivity inherent in a uranium fueled reactor.

In the particular embodiment constructed according to this invention, reactor 10 receives the uranium-bismuth fuel solution from primary pumps 14 and line 22. The fuel solution flows through reactor 10, and while passing through the core therein with its critical size, shape, and moderation achieves a configuration wherein the fuel contained in the solution attains criticality and undergoes a controlled chain-type fission reaction as previously described. The heat generated by this reaction is absorbed by the core structure and by the fuel solution. The fuel solution passes out of the core, becoming noncritical in the process, leaves reactor 10, and flows through line 26 to heat exchanger 16 where it leaves the contained heat to a suitable coolant therein flowing in and out through lines 28 and 30, respectively. The cooled fuel solution then flows to the primary coolant pumps 14 to complete the cycle.

Reactor 10 receives the reflector coolant fluid from reflector coolant pumps 18 and line 32. The reflector coolant then flows through reactor 10 in heat transfer relationship with the core reflector which has been heated by the fission reaction contained within the core, as will be more particularly described below. The reflector coolant is heated in the core thereby and leaves reactor 10, flows through a line 36 to reflector fluid heat exchanger 20 where it releases the contained heat to a suitable coolant flowing in and out of exchanger 20 through lines 33 and 34, respectively. The reflector coolant then flows through reflector coolant pumps 18 to complete the cycle.

Figure 2:
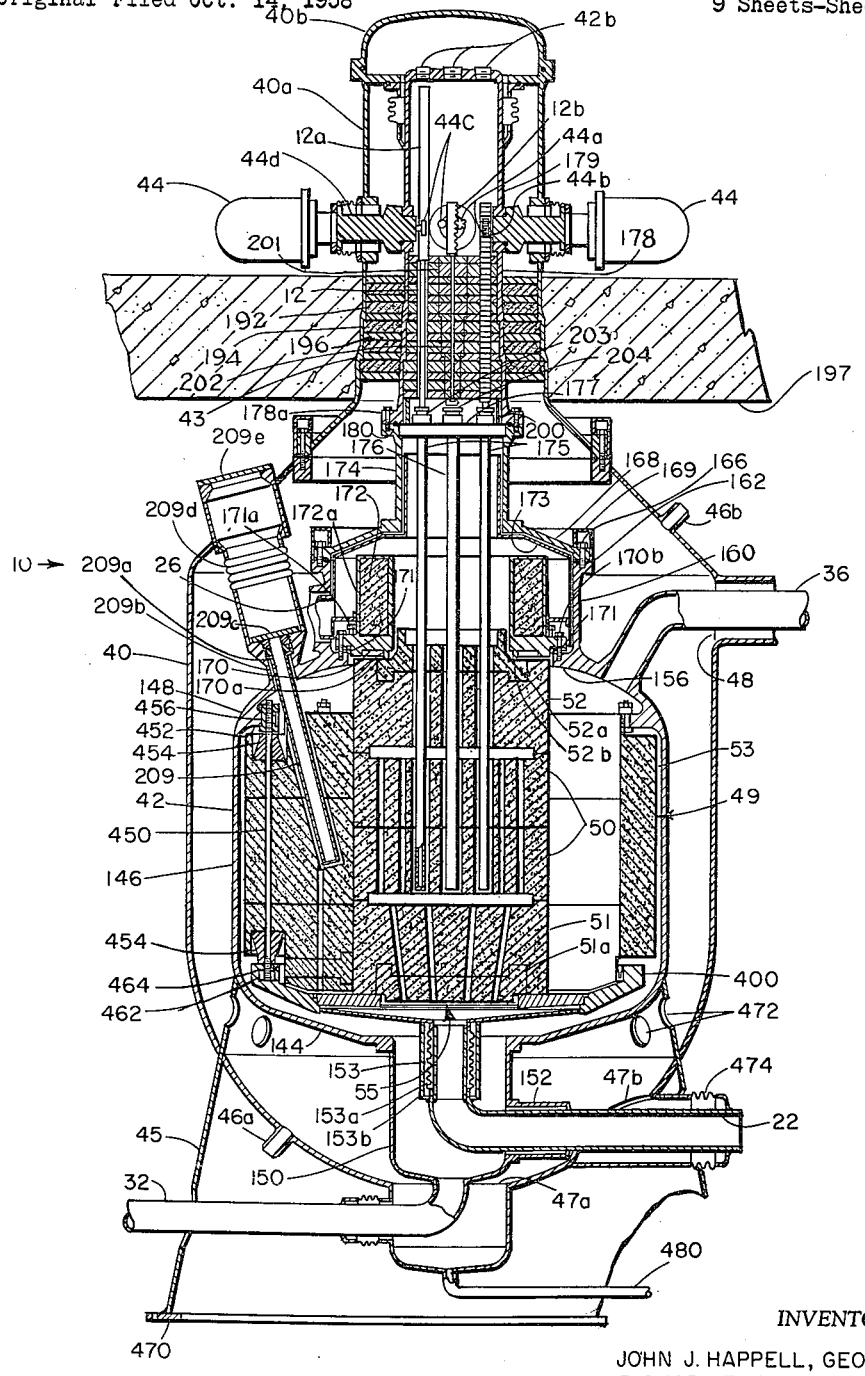
FIGURE 2 is a vertical section through the reactor of the invention taken along section lines 2—2 shown in FIGURES 4, 8, 13 and 17.
Figure 4:
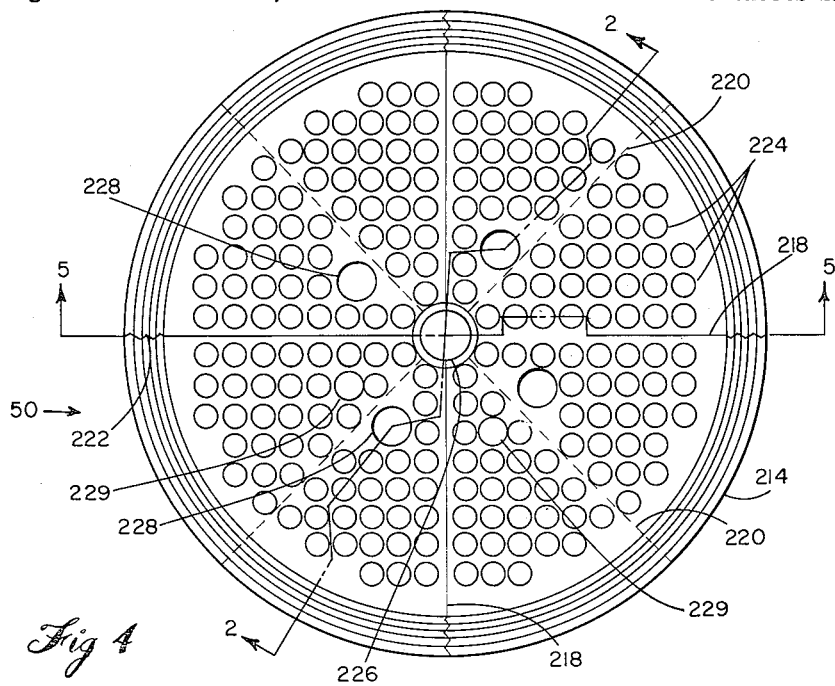
FIGURE 4 is a plan view of the quadrant core assembly.
Figure 5:
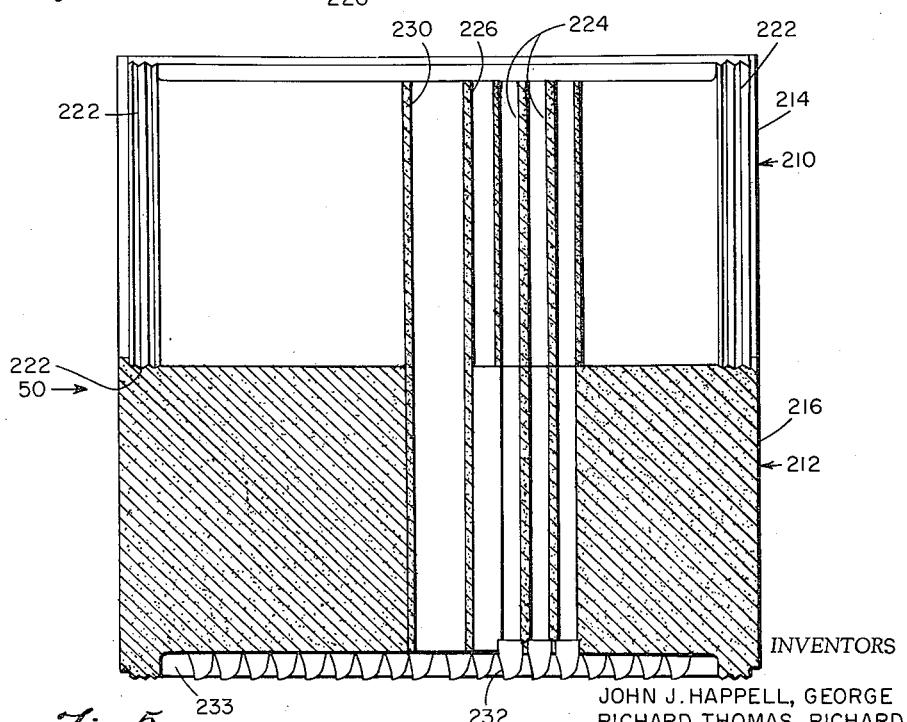
FIGURE 5 is a vertical section of the quadrant core assembly taken along the line 5—5 of FIGURE 4.
Figure 8:
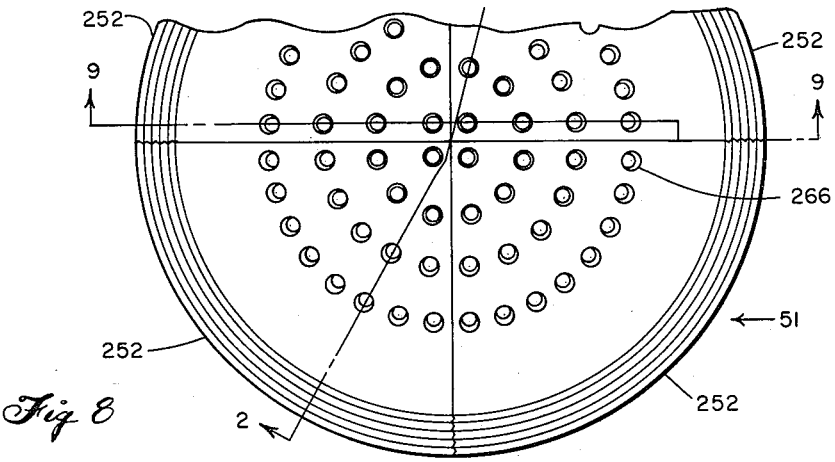
FIGURE 8 is a plan view of the bottom end reflector.
Figure 9:
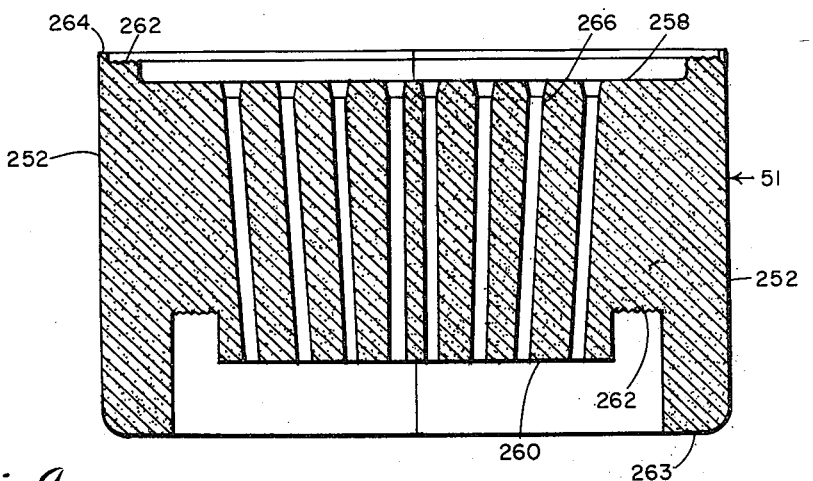
FIGURE 9 is a vertical section of the bottom end reflector taken along the line 9—9 of FIGURE 8.
Figure 10:
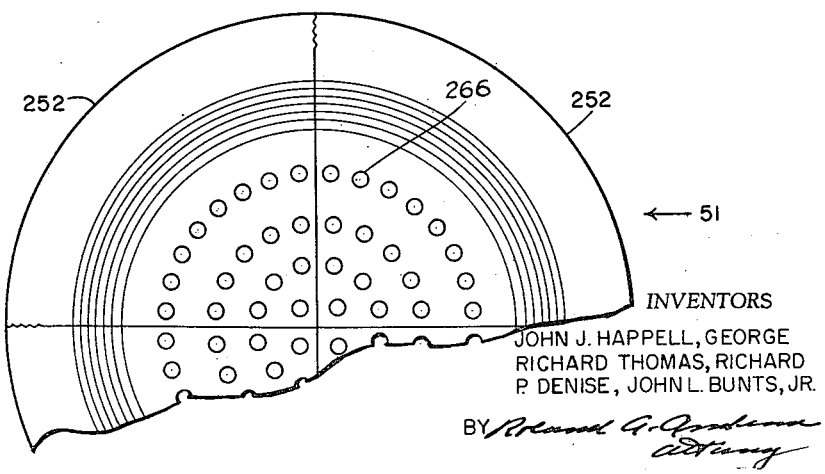
FIGURE 10 is the bottom horizontal view of the bottom end reflector.
Figure 11:
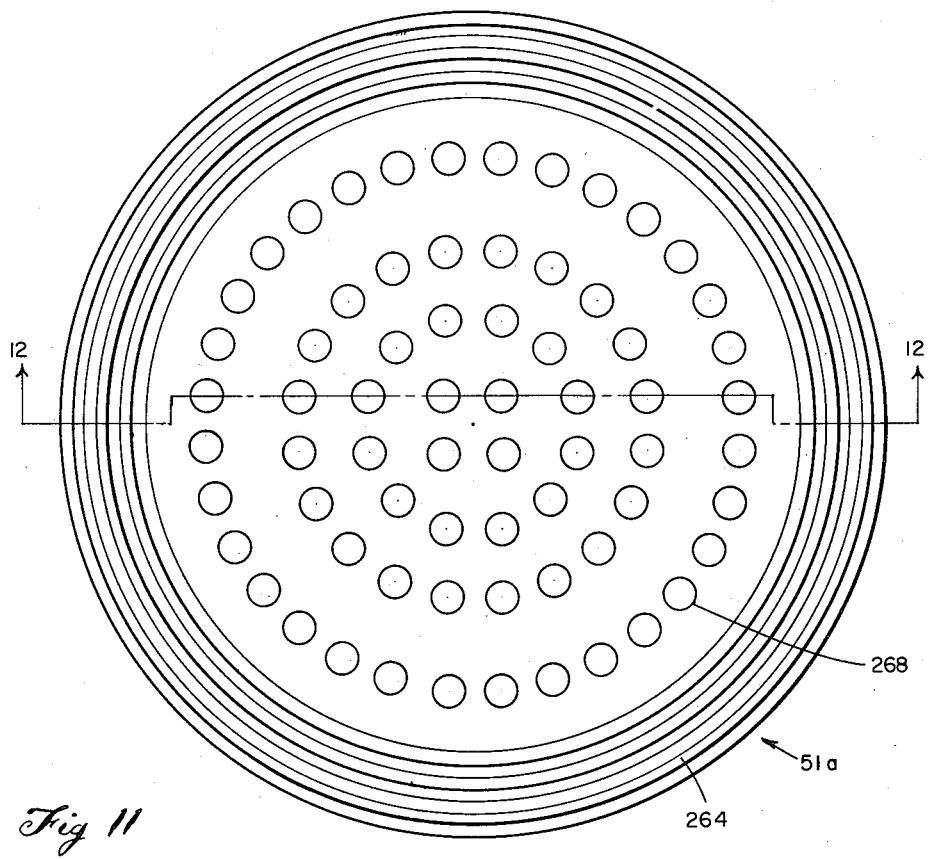
FIGURE 11 is a plan view of the bottom reflector plug.
Figure 12:
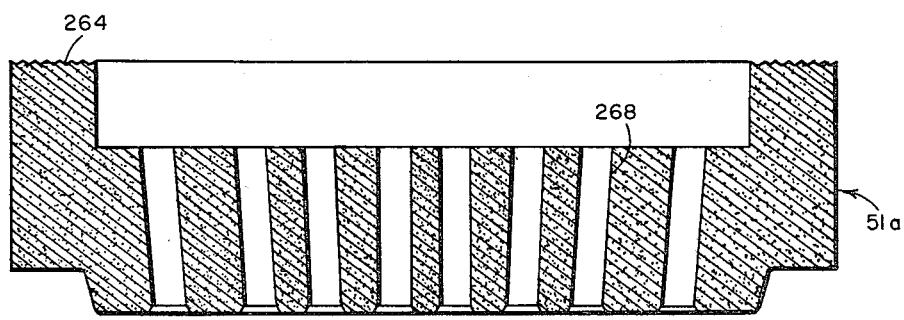
FIGURE 12 is a vertical section of the bottom reflector plug taken along the line 12—12 of FIGURE 11.
Figure 13:
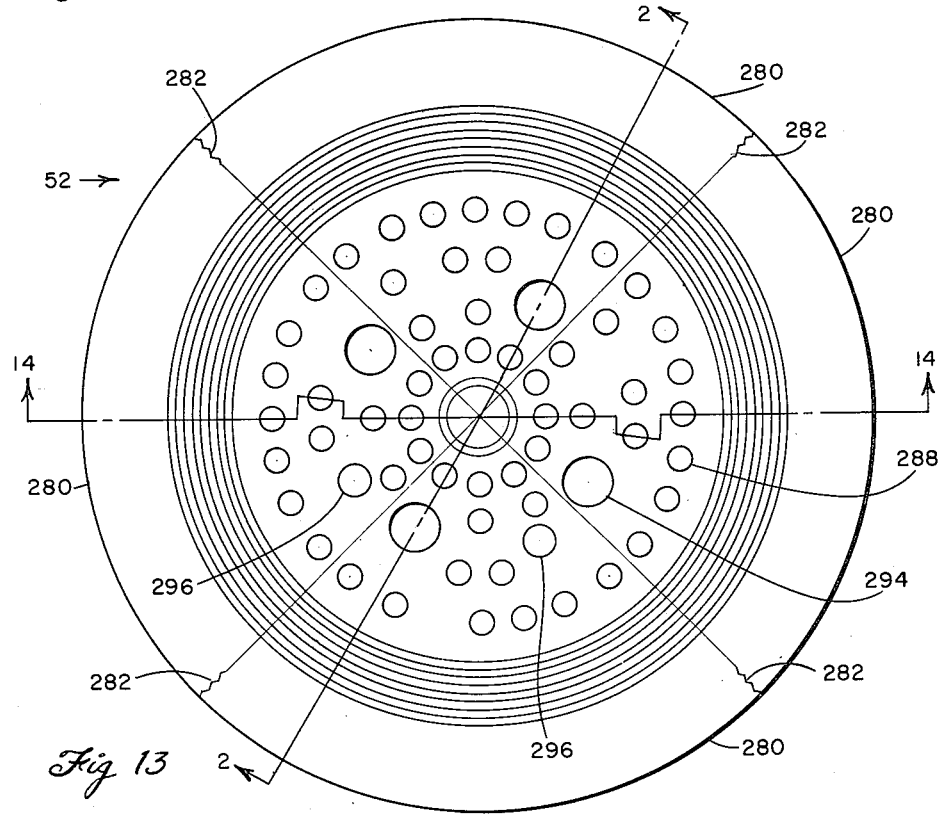
FIGURE 13 is a plan view of the top end reflector without plug.
Figure 14:
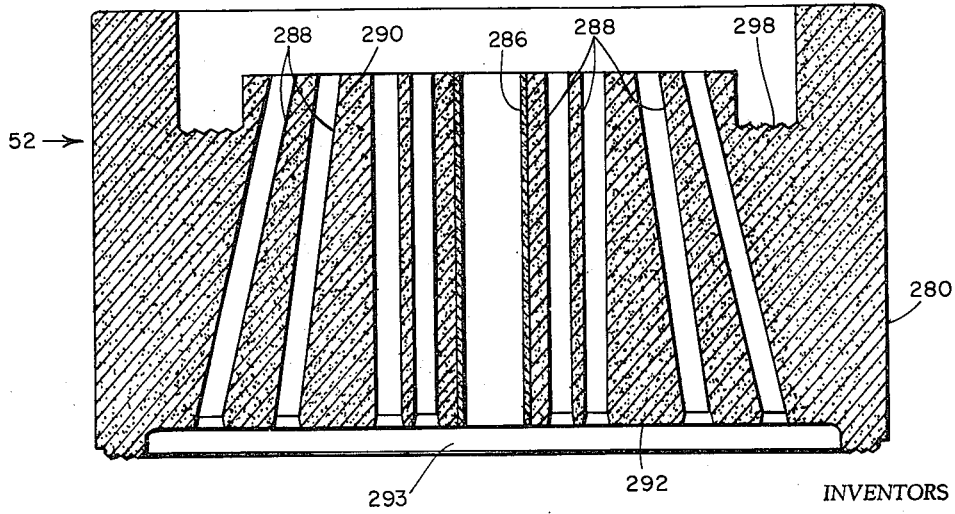
FIGURE 14 is a vertical section of the top end reflector taken along the line 14—14 of FIGURE 13.
Figure 16:
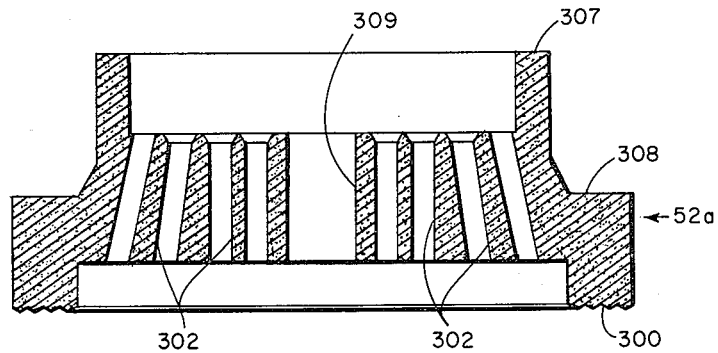
FIGURE 16 is a vertical section of the top reflector plug taken along the line 16—16 of FIGURE 15.
Figure 15:
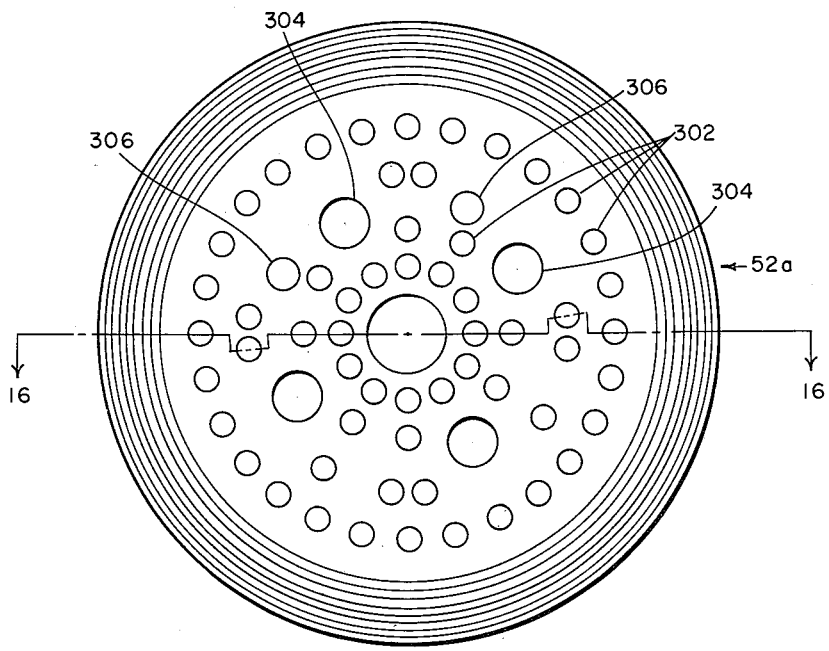
FIGURE 15 is a bottom horizontal view of the top reflector plug.

FIGURE 2 shows details of a preferred embodiment of the reactor 10 of this invention. Reactor 10 is composed of an outer containment vessel 40 of generally cylindrical shape in which there is disposed a vertically elongated pressure vessel 42 in the central portion thereof, a shielding arrangement 43, to be later described, in the upper portion of containment vessel 40, four control rod drives 44, and a support skirt 45 at the bottom for supporting reactor 10. Containment vessel 40 is also provided with a bottom heating gas inlet connection 46a, a top heating gas outlet connection 46b, a pair of lower openings 47a and 47b, and an upper opening 48 for a purpose to be later described. Within pressure vessel 42 there is a core assembly 49 comprising a graphite reactive core 50, a graphite bottom reflector 51 with a plug 51a, and a graphite top reflector 52 with a plug 52a surrounded by a graphite annular reflector assembly 53, all to be later more particularly described. Top reflector 52, bottom reflector 51, and reactive core 50 when assembled comprise the central core assembly 55. At the bottom of pressure vessel 42, there is the core fluid inlet line 22 and the reflector fluid inlet line 32, while at the top thereof there is the core fluid outlet line 26 and the reflector fluid outlet line 36, as illustrated.

Pressure vessel 42 is of circular cross section and has a cupped lower head 144, an integral cylindrical vessel wall 146, and an upper cupped head 148. Lower head 144 opens into a cylindrical section 150 to which is attached the reflector coolant inlet line 32. A sleeve 152 is attached to one side of cylindrical section 150 through which passes, and to which is welded, the primary fluid inlet line 22. An expansion joint 153, including a bellows 153a surrounded by a casing 153b, joins inlet line 22 to core 49 as will be later more particularly described. Upper head 143 is furnished with a circular opening flange 156 of sufficient diameter to permit entrance and exit of central core assembly 55. Extending up from flange 156 and integral with upper head 148 is a cylindrical section 160 whose wall increases in thickness at the upper end to form a closure flange 162. In one side of cylinder 160 is an opening for primary fluid outlet line 26 as illustrated. A plurality of threaded studs 166 are arranged to connect a top head 168 to flange 162 to form a pressure tight joint. This connection is positively sealed by a toroidal bonnet 169 which is seal welded to the upper and lower flanges as illustrated.

An upper graphite-to-metal seal is formed by the pressure between a metallic seal ring 170a of an annular plate 170 and a top surface 52b of top reflector plug 52a. Plate 170 is circular with an opening in the center to accommodate the upper part of top reflector plug 52a and is attached to the upper head 145 of vessel 42 by a plurality of threaded bolts 170b. The vertical alignment of seal ring 170a is adjustably fixed by bolts 179b in conjuction with a seal ring 171 which is located between plate 170 and head 148 as illustrated. A plurality of bolts 171a passing through plate 170 and attached to seal ring 171 permits the adjustment of the latter.

A top cylindrical filler block 172 is integrally attached to the top surface of plate 170 and serves to deflect the primary fluid away from top head 168 to reduce the radiation heating effects on this head. Block 172 is a graphite cylinder contained in a metal can 172a which is perforated to minimize the temperature rise in the graphite. Can 172a is weldably attached to plate 170. A thin metal liner 173 acts as a thermal shield to limit thermal stresses in the reactor vessel 42 at this location due to transient conditions in the primary fluid at the outlet.

Head 168 is provided with an open cylindrical element 174 to accommodate four control rod thimbles 175 and a core experimental port thimble 176 extending downwardly into core 49. A flat circular closure plate 177 with openings to permit thimbles 175 and 176 to pass therethrough tops off cylindrical section 172 and is bolted on in convenient fashion. Another hollow cylindrical member 178 with a flange 178a extends upwardly from cylinder 172, and a seal 180 is used to insure a pressure tight joint at this point. Member 173 is made up of successively smaller cylindrical sections welded together, as illustrated, and terminating in an upper cylindrical section 179. The four control rod drive mechanisms 44, one for each control rod 12, are mounted as illustrated and spaced 90° apart circumferentially around the upper extension of containment vessel 40 designated the control rod housing 40a which is closed off at the top thereof by a cover 40b.

Located within control rod housing 40a below the plane of the control rod drive mechanisms 44 is a shielding plug 192 composed of alternate layers of graphite 194 and steel 196, both within and without the cylindrical section 179 to lower the radiation level at control rod drive mechanisms 44 to a safe amount to permit contact maintenance thereon. Control rod housing 40a is furnished with a series of set-backs to prevent any radiation leakage along the walls of the housing into the contact maintenance area. This area of shielding corresponds to and is in a plane with the concrete shielding plug 192 which covers the reactor pit and forms in effect a portion of the concrete flooring 197 over it. Shielding plug 192 is supported within cylindrical section 179 by an inner sleeve 200 which is supported by plate 177 and is provided with appropriate openings to permit passage of control rods 12. The center of shielding plug 192 is provided with a removable plug 201 constructed in the same manner as shielding plug 192 to allow access to core 49. The various layers of shielding in removable plug 201 are held together and aligned by a long bolt 202 extending therethrough and secured at both ends.

The four control rod thimbles 175 which extend into core assembly 49, as illustrated, receive control rods 12 while central core experimental port thimble 176 extends into core 49 for a purpose to be later described. Thimbles 175 and 176 are fabricated of beryllium tubing and extend from the control rod seal plate 177 through reactive core 50 where they are sealed against the reactor fluid at their bottoms. The upper ends of thimbles 175 and 176 form flanges 203 and 204 which are seated in the control rod seal plate 177 and form seals between the reactor area and the control rod housing and act as supports for the thimbles which hang therefrom into the core area. As particularly shown in FIGURE 3a, the thimble flanges 203 and 204 are positively seated in the control rod seal plate 177 by packing nuts 205 which are threaded into sleeves 206 which in turn are weldably attached to control rod seal plate 177. Packing nuts 205 for control rod thimbles 175 are furnished with seal rings 207 which seal around the control rods 12 and prevent any leakage into the control rod housing 40a should control rod thimbles 175 develop a leak within the reactor core.

In the particular reactor constructed, three of the four control rods 12 are shim-safety rods while the fourth rod 12 is used to function as the regulator rod. Control rod thimbles 175 serve to keep rods 12 out of the radioactive primary fluid and limit the amount of radioactive gases which may leak into the control rod dome. Control rods 12 are cylindrical in cross section and have a hollow center so that a leak in a thimble 175 will not seriously delay the scramming of its control rod 12 due to hydraulic damping.

Each control rod 12 is integrally attached at its upper extremity to a control rod extension 12a. Control rod extensions 12a are cylindrical in cross section with a gear rack 12b machined on one side of each. Each gear rack 12b mates with and is driven by a spur gear 44a which is integrally attached by output shaft 44b to its control rod drive mechanism 44. The control rod extension 12a is held in mesh with spur gear 44a by a roller guide 44c which is located and supported by the control rod drive mechanism 44. The shafts for gears 44a and rollers 44c are connected to the interior of mechanisms 44 by passing through supporting structure 44d. Control rod mechanisms 44 and the construction illustrated for driving rods 12 do not form a part of this invention. Control rod housing 40a is closed off at its top, and access plugs 42b are provided as shown. Containment vessel 40 is topped off with a cover 40b which may be bolted and sealed in any convenient fashion as is understood in the art.

Core experimental port thimble 176, previously described, is designed for nuclear testing of materials in a high neutron flux area and yet separated from the reactor fluid. Thimble 176 may also be used to contain a start-up neutron source or monitoring instrument (not shown).

Also provided are seven side reflector experimental port thimbles 209, each of which is a beryllium tube closed at the bottom thereof and ending in a flanged section 209a at the other. Thimbles 209 extend through nozzles 209b in reactor vessel 42 with the flanged end section 209a being seated by a seal plate 209c that is boltably attached to nozzle 209b in a convenient fashion. Seal plate 209c also serves to contain any radioactive fluid should a rupture occur in a thimble 209. Nozzle 209b is weldably attached to the outer containment vessel 40 by a flexible metallic bellows 209d which is then sealed at the outer end by a secondary seal plate 209c which may be bolted on.

The details of reactive core 50 are best seen in FIGURES 4, 5, 6 and 7. Core assembly 50 is comprised of a multiplicity of graphite blocks machined to the preferred configuration and cemented together, as will now be described. Core 50 consists of two layers 210 and 212 of four quadrants 214 and 216 each, respectively. Quadrants 214 and 216 of each layer are rotated 45° relative to the other layer to offset the vertical joints to form a stronger structure than would be obtained if the joints wherein line as shown by the solid and broken lines 218 and 220, respectively, in FIGURE 4. Each quadrant 214 and 216 has a saw-tooth joint 222 machined around its outer edges to provide a leak-tight seal when joined and cemented to the adjoining piece, and each quadrant 214 and 216 is also drilled with a multiplicity of holes 224 parallel to the vertical axis to act as flow channels for the primary fluid and drilled further with a larger diameter hole 228 to accommodate control rod thimbles 175. Two of quadrants 216 are provided with core test holes 229. Quadrants 214 and 216 meet and are cemented at the center thereof to form a central opening 226 to accommodate a graphite cylinder 230 which forms a part of the sleeve for the core experimental port thimble 176. The outer surface of core 50 forms the core tank which separates the core fluid from the reflector fluid, as will be later seen. Each flow channel 224 is provided with a graphite core flow fitting 232 with three openings 232a at the bottom thereof to control the primary fluid flow into core 50. Core flow fittings 232 are located in a lower plenum chamber 233 which is formed between the bottom of core 50 and the top of bottom end-reflector 51. Plenum chamber 233 tends to equalize the pressure of the primary fluid entering core 50 and thereby evens the fluid flow through the core.

Bottom end reflector 51, shown in FIGURES 8, 9, 10, 11 and 12, is formed of four identical graphite quadrants 252 and a bottom reflector plug 51a of generally cylindrical shape. It will be seen from FIGURES 8 and 9 that the four graphite quadrants 252 are assembled to form a cylindrical member having a circular depression 253 in the top surface thereof and in the bottom surface a deeper circular depression 260 in which bottom reflector plug 51a fits as illustrated in FIGURE 2. The top surface of bottom end-reflector 51 is provided with an annular shoulder 262 having saw-tooth grooves thereon and a lip 264 to permit engagement with appropriate saw-tooth grooves and shoulder on the bottom surface of reactive core 50 as previously described. It should be noted that depression 258 forms with core 50 the lower plenum chamber 233 of the core assembly. Bottom depression 260 formed by quadrants 252 is provided with an annular groove 262 at the bottom of which are also saw-tooth grooves for mating with a shoulder 264 of bottom reflector plug 51a. Extending through quadrants 252 are a plurality of cylindrical holes 266 which may have a slight convergence in a downward direction. Bottom reflector plug 51a is also provided with a plurality of holes 268, and these are arranged in number and in such a fashion that when plug 51a is fitted into depression 260, holes 268 will coincide or line up with holes 266 thereby forming a series of continuous passageways through bottom end-reflector 51. It should be noted that the tops of openings 266 are countersunk to smooth out the flow from the openings into the lower plenum chamber 233 as is understood in the art, and that the bottom surface of bottom end-reflector 51, consisting of the annular shoulder 263 and the bottom surface of bottom reflector plug 51a, forms a surface as illustrated in FIGURE 2 which permits the mounting and sealing of the core assembly to be described further below.

Top reflector 52, as shown in FIGURES 13, 14, 15 and 16, is formed of four graphite quadrants 280 cemented at saw-tooth joints 282 therebetween to form an integral member with a graphite cylinder 286 in the center to form a part of the sleeve for the core experimental thimble 176. Quadrants 280 are provided with a multiplicity of holes 288, some of which diverge downwardly to form the flow channels for the primary fluid extending from top face 290 to the lower face 292; the lower face 292 being the top of an upper plenum chamber 293 found between top reflector 52 and core 50 for a purpose as that of lower plenum chamber 233 previously described. Each hole 288 is countersunk to a predetermined depth from upper plenum chamber 293 for smoothing the transition from the plenum chamber to the channels. Each quadrant 280 is also provided with a larger diameter hole 294 which is in line with, and to accommodate, a control rod thimble 175. Two holes 296 in reflector 52 are also provided in alignment with, and to provide access to, the core test holes 229. The upper face 290 of reflector 52 is provided with an annular channel 298 having saw-tooth grooves to mate with a saw-toothed shoulder 300 of top reflector plug 52a. Top reflector plug 52a is machined from a solid piece of graphite and is provided with flow holes 302 that are in alignment with holes 288 of quadrants 280. Control rod thimble holes 304, access holes 306 for the core test holes 229, and central opening 309 for the core experimental thimble 176 are also provided in the top reflector plug 52a, and these align with respective holes in quadrants 280. Top surface 307 and shoulder 308 of top reflector plug 52a form the sealing surface for the upper graphite-to-metal seal described above.

Figures 17, 19:
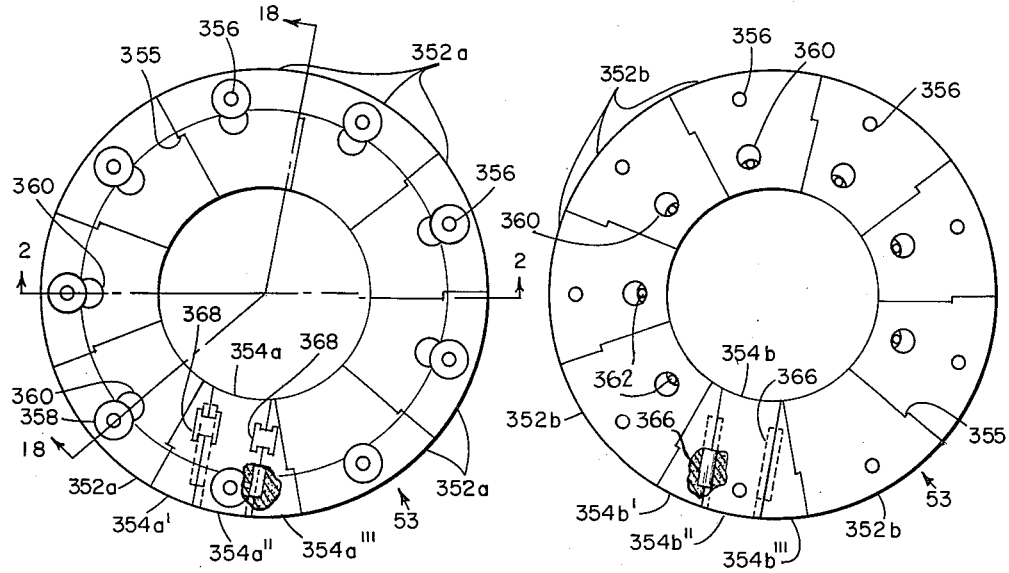
FIGURE 17 is a plan view of the annular side reflector assembly.
FIGURE 19 is a horizontal section of the side reflector assembly taken along the line 19—19 of FIGURE 18.
Figure 18:
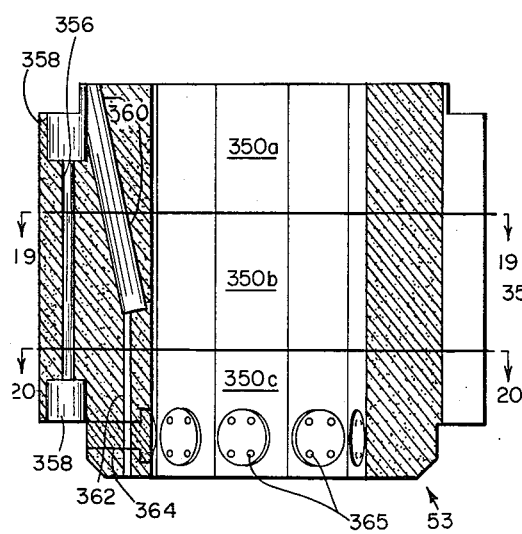
FIGURE 18 is a vertical section of the side reflector assembly.
Figure 20:
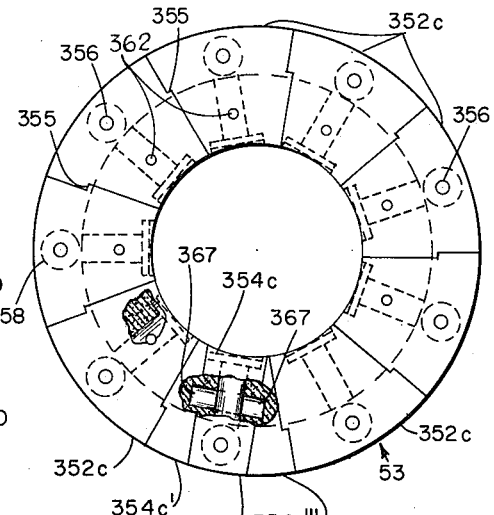
FIGURE 20 is a horizontal section of the side reflector assembly taken along the line 20—20 of FIGURE 18.

Graphite side reflector assembly 53, as shown in FIGURES 17, 18, 19 and 20, is composed of three annular layers or sections 350a, 350b and 350c which totally surround reactor core assembly 55 and provide a radiation shield and a neutron reflector to reflect neutrons escaping from the sides of core 50 back into the core to help sustain the chain reaction. Top section 350a is formed of eight whole graphite segments 352a; middle section 350b is formed of eight whole graphite segments 352b; and bottom section 350c is formed of eight whole graphite segments 352c. In addition, each layer of section 350a, b and c has a key segment 354a, b and c, respectively, each of which is formed from three parts, as for example 354a′, 354a″ and 354a‴ in key segment 354a; and key segments 354b and 354c are similarly constructed. Key segments 354a, b and c for layers or sections 350a, b and c, respectively, allow the annular reflector assembly 53 to be assembled while in reactor 10, since pressure vessel 42 does not have an opening large enough to permit assembly before mounting therein. The joints between each of the various segments of reflector 53 are provided with offsets 355 shown in FIGURE 17 to reduce possible radiation leakage at the joints. Each whole segment 352a, b and c is furnished with a drilled hole 356, and each hole 356 is provided at both extremities thereof with a seat 358 for a purpose to be later described. The above mentioned holes 356 and seats 358 are also provided in the center parts 354a″, 354b″ and 354c″ of the key sections 354a, b and c, respectively. Each segment 352a, b and c of the side reflector assembly 53 is also drilled with a plurality of holes (not shown) parallel to the vertical axis of reactor 10 to provide coolant channels for the reflector coolant. Seven of the eight full segments 352a and b in the top and middle layers 350a and 350b are provided with experimental port holes 360 which extend from the top surface of reflector 53 at an angle toward the center of reflector 53 as shown in FIGURE 18 for a purpose to be later described. A vertical hole 362 of narrower diameter than hole 360 is drilled in the bottom of the experimental port hole 360 to provide a coolant channel from the bottom to the top of reflector 53. Each of the full sections 352c is provided with a circular graphite plug 364 which is bolted into place so as to provide access to the outside of reflector 53 from the interior thereof with reactive core 50 and the top and bottom reflectors 52 and 51 removed for facilitating assembly of the reactor internals. Each plug 364 is boltably attached to its reflector segment 352c by a plurality of graphite bolts 365; in this manner no variation in the nuclear cross section of the reflector is encountered due to extra metallic parts being inserted therein. An above mentioned plug 364 and bolts 365 are also provided in the center part 354c″ of the associated key segments 354c. The three portions of segments 354a, b and c are held in alignment by a group of cylindrical keys 366 and 367 and by boltably attached connector strips 368 between the center section 354a″ and the side sections 354a′ and 354a‴ in top layers 350a as shown in FIGURE 17.

Referring back to FIGURE 2, it is seen that the core structure 49 is supported from the bottom thereof by a core support plate 400. As more particularly shown in FIGURE 3c, support plate 400 is composed of a thickened annular ring 402 and a disked central section 404 opening into inlet 22 for the primary fluid. A plurality of three annular steel ring plates 406 comprise the metal portion of the lower graphite-to-metal seal and are supported by, but not rigidly attached to, an inner shoulder 407 of ring 402. Plates 406 are so designed as to flex independently of each other, thereby providing the necessary flexible support of central core assembly 55 without inducing excessive stresses in either the core structure or the metal rings. Central core assembly 55, comprising core 50 and reflectors 51 and 52, are supported by a circumferential lip 408 formed on the upper, inner circumference of the upper metal ring 406 to mate with the bottom surface of the bottom reflector plug 51a to form the lower graphite-to-metal seal. A flexible metallic diaphragm 410 is welded to the circumferential rib 408 and to annular ring 402 to form a positive seal at the juncture of the three ring plates 406 and annular ring 402. The center of section 404 is provided with a circular opening and a downward projecting flange 412 which is attached to metal bellows 153a illustrated in FIGURE 2. Bellows 153a is weldably attached at its opposite end to the primary fluid inlet line 22 and provides a flexible coupling between inlet line 22 and the core support plate 400.

Returning to FIGURE 2, core support plate 400 is suspended within reactor vessel 42 by a plurality of support rods 450 which hang from a support flange 452 which is an integral part of head 148. Rods 450 are fabricated from a molybdenum-titanium alloy which, in conjunction with steel shoes 454, form a member which compensates for the differential thermal expansion of support rods 450 and the graphite reflector segments 350a, b and c which are supported thereon. As more particularly shown in FIGURE 3d, the upper end of each rod 450 is provided with a threaded length of smaller diameter than the major length of rod 450, on which is threaded an internally and externally threaded bushing 456. An adjusting nut 458 is threaded onto bushing 456 and clamps support rod 450 in the slot provided in support flange 452 and provides vertical adjustment and alignment of core support plate 400. A lock nut 460 locks the nut 458 and bushing 456 in position once core support plate 400 is aligned. The lower end of each support rod 450 is provided with a nut 462 which clamps the support rods 450 in the slot provided therefor in the core support plate 400. Once rods 450 have been inserted in core support plate 400, lock plates 464 are boltably attached in the rod slot to positively lock support rods 450 to support plate 400.

Entire reactor 10 is supported by conically shaped support skirt 45 which is weldably attached at the upper end to lower head 144 of reactor 10, passes through containment vessel 40, and down to a base ring 470 which is rigidly attached to some suitable reactor foundation (not shown). Skirt 45 is provided with a multiplicity of openings 472 between containment vessel 40 and reactor 10 to provide for gas flow to all parts of the exterior of reactor vessel 10. Containment vessel 40 provides a secondary barrier to any possible radioactive leakage from reactor 10. Flexible metallic bellows such as 474 provide leak-tight seals which permit relative movement between the reactor system and the containment vessel, while an outlet 480 acts as a drain for containment vessel 40.

In the operation of reactor 10, it is first necessary to preheat reactor 10 before entrance of the primary and reflector fluids which are solid at ordinary temperatures. For this purpose, helium gas at an elevated temperature is delivered into the space between containment vessel 40 and pressure vessel 42 through opening 46a and exhausted through opening 46b until reactor 10 reaches the proper elevated temperature at which the primary and secondary coolants will not be cooled to solidification.

The fuel solution is then delivered at proper temperature to the core pass of reactor 10 through inlet 22. The fuel solution then passes upward through the flow channels in core assembly 55 described previously. A small percentage of the flow passes through the test holes 229 and around the core experimental port thimble 176 as well as around the control rod thimbles 175 to cool these thimbles. The major part of the fuel solution, however, flows through the core flow channels and achieves criticality in the region of reactive core 50 and undergoes a controlled chain-type fission reaction. The fuel solution then enters the upper plenum chamber 293 where it becomes sub-critical and flows therefrom through the upper reflector 52. The fluid then enters the outlet plenum formed by graphite and filler block 1722 and leaves the reactor through the outlet pipe 26.

The reflector fluid enters the reactor through the inlet connection and passes around the outside of the bottom graphite-to-metal seal and through the side reflector assembly 53, removing the heat therein. The reflector fluid then passes out of the reactor vessel 42 through the outlet nozzle 36.

To further illustrate the preferred embodiment of the invention, Table I below gives details of the reactor described above.

TABLE I
*Reactor data*

Core:
| | |
|---|---|
| Overall diameter | 50 inches. |
| Active diameter | 40 inches. |
| Overall height between faces | 42 inches. |
| Cemented seal width | 3 inches. |
| Graphite density; type | 112 lbs./ft.$^3$; impervious grade. |
| Average bismuth density | 615 lbs./ft.$^3$. |
| Bismuth/graphite volume ratio, average | 0.513. |
| Fuel channel diameter | 1.5 inches. |
| Fuel channel pitch | 2.1 inches, square. |
| Total number of fuel channels | 226. |
| Control rod hole diameter | 3.25 inches. |
| Total number of control rod holes | 4. |
| Number core experimental thimble holes | 1. |
| Core experimental wet immersion test holes | 2. |
| Core experimental wet immersion test hole diameter | 2 inches. |
| Core experimental thimble hole diameter | 3.5 inches. |
| U—Bi volume in active core | 10.4 ft.$^3$. |
| Power output (heat) | 20 M.W. |
| Core coolant | U—Bi solution. |
| Mg additive concentration | 350 p.p.m. |
| Zr additive concentration | 200 p.p.m. |
| Fuel cycle without reprocessing | 20 M.W.-yrs. |
| Initial U$^{235}$ concentration | 800 p.p.m. |
| Enrichment | 93.5%. |
| U—Bi flow rate | 14×10$^3$ lbs./hr. |
| U—Bi flow velocity | 2.1 f.p.s. |
| Reactor U—Bi inlet temperature | 750° F. |
| Reactor U—Bi outlet temperature | 885° F. |
| Average U—Bi temperature | 817° F. |
| U—Bi static pressure in upper plenum | 48 p.s.i.a. |
| U—Bi static pressure in lower plenum | 64.7 p.s.i.a. |
| Total U—Bi pressure drop through core | 0.6 p.s.i. |
| Control rod hole annulus U—Bi velocity | 2.1 f.p.s. |
| Experimental thimble hole annulus velocity | 2.1 f.p.s. |

Bottom end reflector and plug:
| | |
|---|---|
| Overall diameter | 50 inches. |
| Overall height, including plug | 2 feet 8 inches. |
| Bismuth/graphite volume ratio, average | 0.22. |
| Cemented seal width | 3 inches. |
| Fuel channel diameter | 2 inches. |
| Total number of fuel channels | 40. |
| U—Bi volume | 2.44 ft.$^3$. |
| U—Bi flow velocity | 7.3 f.p.s. |
| U—Bi static pressure at reflector inlet | 82.9 p.s.i.a. |
| Total U—Bi pressure drop through reflector | 6.1 p.s.i. |

Top end reflector:
| | |
|---|---|
| Overall diameter | 50 inches. |
| Overall height, to plug top face | 2 feet 8 inches. |
| Bismuth/graphite volume ratio, average | 0.27. |
| Cemented seal width | 3 inches. |
| Fuel channel diameter | 2 inches. |
| Total number of fuel channels | 34. |
| U—Bi volume | 2.75 ft.$^3$. |

TABLE I—Continued

Top end reflector—Continued

| | |
|---|---|
| Control rod hole diameter | 3.25 inches. |
| Total number of control rod holes | 4. |
| Number of immersion test holes; diameter | 2; 2 inches. |
| Number experimental thimble holes | 1. |
| Experimental thimble hole diameter | 3.5 inches. |
| U—Bi flow velocity, average | 6.7 f.p.s. |
| U—Bi static pressure at reflector outlet | 30.7 p.s.i.a. |
| Height above reflector top face to free surface | 3.75 feet. |
| Gas pressure above free surface | 14.7 p.s.i.a. |
| Total U—Bi pressure drop through reflector | 5.6 p.s.i. |

Core—End reflector assembly:

| | |
|---|---|
| Overall diameter | 50 inches. |
| Overall height between faces | 9 feet 4 inches. |
| Plenum diameter | 3 feet 6 inches. |
| Plenum height | 3 inches. |
| Plenum volume (total) | 4.42 ft.$^3$. |
| Weight of graphite in core and end reflectors | 11,165 lbs. |
| Graphite buoyant force | 49,835 lbs. (maximum). |
| Upper graphite-metal seal, O.D. | 3 feet nominal. |
| Upper graphite-metal seal contact pressure | 200 p.s.i. min.; 800 p.s.i. max. |
| Total U—Bi volume between reflector faces | 20 ft.$^3$. |
| Total U—Bi volume inlet well to outlet pipe | 74.9 ft.$^3$. |
| Reactor U—Bi inventory inlet well to outlet pipe | 46,000 lbs. |

Side reflector:

| | |
|---|---|
| Overall diameter of side reflector | 8 feet 10 inches. |
| Reactor vessel inside diameter | 9 feet. |
| Inside diameter of side reflector | 4 feet 2¼ inches. |
| Overall height of side reflector | 7 feet 9 inches. |
| Side reflector thickness | 27⅞ inches. |
| Graphite density; type | 112.3 lbs./ft.$^3$; impervious grade. |
| Thickness of inside annulus | 0.36 inch (hot). |
| Thickness of outside annulus | 1 inch (hot). |
| Weight of graphite in side reflector | 35,200 lbs. |
| Average weight of graphite in a regular segment | 3,900 lbs. |
| Number of segments | 8 regular; 3 key. |
| Number of reflector test holes | 4. |
| Reflector test hole diameter | 6.5 inches. |
| Coolant | Bismuth. |
| Bismuth flow rate; heat load @ 20 M.W. | 1.4×10$^6$ lbs./hr.; 0.34 M.W. |
| Bismuth velocity (average) at midplane, hot | 0.19 f.p.s. |
| Bismuth inlet temperature | 865° F. @ 20 M.W. |
| Bismuth outlet temperature | 885° F. @ 20 M.W. |
| Bismuth temperature rise in reflector | 20° F. |
| Bismuth volume, inlet dome to outlet piping | 105 ft.$^3$. |
| Bismuth inventory in side reflector | 64,500 lbs. (hot). |

Nuclear parameters (all refer to initial hot clean condition):

| | |
|---|---|
| Critical mass | 3.25 kg. |
| Average core thermal flux | 2.1×10$^{14}$. |
| Average fission density, based on core fuel volume | 2.1×10$^{12}$. |
| Effective prompt neutron lifetime | 8×10$^{-4}$. sec. |
| Thermal diffusion length | 261 cm.$^2$. |
| Fermi age, core | 448.4 cm.$^2$. |
| Fermi age, side reflector | 233 cm.$^2$. |
| Prompt temperature coefficient | −5×10$^{-5}$k/° C. |
| Final temperature coefficient | −1.8×10$^{-4}$ k/° C. |
| Steady state effective delayed neutron fraction | .0025. |

Reactor vessel:

| | |
|---|---|
| Material | 2¼% Cr–1% Mo steel. |
| Inside diameter of main shell | 9 feet. |
| Thickness of main shell | 1³⁄₁₆ inches (minimum). |
| Approximate overall height (both parts) | 39½ feet. |
| Design pressure (bottom vessel) | 100 p.s.i. |

Control rods:

| | |
|---|---|
| Material | Tantalum. |
| Outside diameter | 1½ inches. |
| Inside diameter | ¼ inch. |
| Active length | 4 feet. |
| Overall length, including extension rod | 17 feet. |
| Travel | 4 feet. |
| Maximum withdrawal rate | 6.3 in./min. |
| Maximum reactivity addition rate | .01% k/sec. |
| Total rod worth (3 shims) | .12 k (hot). |
| Core traverse time on scram | 0.6 sec. |
| Minimum shutdown reactivity | .039 k. |

Reflector test holes:

| | |
|---|---|
| Number | 7. |
| Thimble length | 7 feet. |
| Thimble I.D. | 4 inches. |
| Thimble thickness | ¼ inch. |
| In-pile length | 5 feet. |

It should be understood, of course, that the foregoing disclosure relates only to one preferred embodiment of this invention and that numerous modifications and alterations thereof may be made therein without departing from the spirit and the scope of the invention as set forth in the appended claims.

We claim:

1. In a liquid metal fuel neutronic reactor, a graphite segmented reactive core, top and bottom graphite reflectors for said core forming a central core assembly, an annular reflector surrounding and contacting said central core assembly constructed of segmented graphite members, main flow passageways formed in said core assembly for permitting primary liquid flow through said reactive core in critical amounts of said fuel, means for supporting said assembly and said annular reflector to permit relative movement therebetween due to difference in thermal expansion thereby relieving tensile stresses in said core assembly and annular reflector, the latter said means including a core support plate having a thickened annular ring with an inner annular shoulder and a thin central section, a plurality of stacked annular ring plates set within said ring on said support plate with the outer edge of the bottom ring plate supported by said inner shoulder and the inner edge of the top annular ring plate having a lip in contact with and supporting said central core assembly to contain primary liquid flow within said central core assembly, said stacked ring plates being mounted to flex independently of each other to support said core assembly without inducing excessive stresses in said core assembly and ring plates, and an annular flexible metallic diaphragm extending between said lip and said thickened annular ring to form a positive seal at the juncture of said stacked ring plates and thickened annular ring.

2. In a liquid metal fuel neutronic reactor, a graphite segmented reactive core, top and bottom graphite reflectors for said core forming a central core assembly, an annular reflector surrounding said central core assembly constructed of segmented graphite members, main flow passageways formed in said central core assembly for permitting primary liquid flow through said reactive core in critical amounts of said fuel, secondary flow passageways formed in said annular reflector to permit secondary liquid flow therethrough, means for sealing said primary flow from said secondary flow, the latter said means including an upper graphite-to-metal seal formed by pressure exerted by an annular metallic seal ring biased into contact with the top surface of said top graphite reflector, and means for supporting said core comprising a core support plate having a thickened annular ring with an inner annular shoulder and a thin central section, a plurality of stacked annular ring plates within said ring on said support plate with the outer edge of the bottom ring plate supported by said inner shoulder and the inner edge of the top annular ring having a lip in contact with and supporting said central core assembly to contain primary liquid flow within said central core assembly, said stacked annular ring plates being mounted to flex independently of each other to support said core assembly without inducing excessive stresses in said core and ring plates, and an annular flexible metallic diaphragm extending between said lip and said thickened annular ring to form a positive seal at the juncture of said stacked ring plates and thickened annular ring, said top annular ring plate lip forming a lower graphite-to-metal seal resiliently urged into contact with the bottom surface of said graphite reflector by the weight of said core assembly and the force exerted by said upper metallic seal ring.

3. In a liquid metal fuel neutronic reactor, a graphite reactive core, top and bottom graphite reflectors for said core forming a central core assembly, an annular reflector surrounding said central core assembly constructed of segmented graphite members, main flow passageways formed in said core assembly for permitting primary liquid flow through said reactive core in critical amounts of said fuel, secondary flow passageways formed in said annular reflector to permit secondary liquid flow therethrough, means utilizing vertically extending rods for clamping said annular reflector firmly under compression, and means suspended by said rods for supporting said central core assembly to permit relative axial movement between said reflector and said core assembly, the latter said means including a core support plate having a thickened annular ring with an inner annular shoulder and a thin central section, a plurality of stacked annular ring plates set within said ring on said support plate with the outer edge of the bottom ring plate being supported by said inner shoulder and the inner edge of the top annular ring plate having a lip in contact with and supporting said central core assembly to contain primary liquid flow within said central core assembly, said stacked annular ring plates being mounted to flex independently of each other to support said core assembly and ring plates, and an annular flexible metallic diaphragm extending between said lip and said thickened annular ring to form a positive seal at the juncture of said stacked ring plates and thickened annular ring.

References Cited in the file of this patent

UNITED STATES PATENTS 2,865,828    Long _____ Dec. 23, 1958

OTHER REFERENCES

Miles et al.: "International Conference on the Peaceful Uses of Atomic Energy," vol. 3, pp. 125–133, August 1955, U.N. Publication, N.Y.

BAW–1004, LMFRE Quarterly Progress Report (November 1956–February 1957), pp. 104–113, received in U.S. Patent Office, Sept. 3, 1957.

BAW–1049–1, LMFRE Final Hazards Evaluation, 107 pages, June 1958.